US007082240B2

(12) United States Patent
Oetliker

(10) Patent No.: US 7,082,240 B2
(45) Date of Patent: Jul. 25, 2006

(54) HOME AND BUILDING INFORMATION SYSTEM

(76) Inventor: Michael Oetliker, Landhaus Escherweg 9 CH-8546, Kefikon (CH)

( * ) Notice: Subject to any disclaimer, the term of this patent is extended or adjusted under 35 U.S.C. 154(b) by 21 days.

(21) Appl. No.: 10/508,931

(22) PCT Filed: Mar. 13, 2003

(86) PCT No.: PCT/CH03/00166

§ 371 (c)(1),
(2), (4) Date: Sep. 23, 2004

(87) PCT Pub. No.: WO03/081739

PCT Pub. Date: Oct. 2, 2003

(65) Prior Publication Data

US 2005/0161245 A1    Jul. 28, 2005

(30) Foreign Application Priority Data

Mar. 25, 2002    (CH) .................................... 0511/02

(51) Int. Cl.
*G02B 6/44* (2006.01)
(52) U.S. Cl. .................................... 385/101
(58) Field of Classification Search ................. 385/101
See application file for complete search history.

(56) References Cited

U.S. PATENT DOCUMENTS 5,043,531 A    8/1991    Gutenson et al.
6,114,632 A *  9/2000   Planas et al. ............ 174/117 R
6,141,356 A * 10/2000   Gorman ....................... 370/493
6,539,147 B1 * 3/2003   Mahony ....................... 385/24
6,563,796 B1 * 5/2003   Saito .......................... 370/252
6,855,881 B1 * 2/2005   Khoshnood ................. 174/15.1
2002/0015565 A1* 2/2002 Imamura ...................... 385/88
2002/0176567 A1* 11/2002 Chen et al. ............ 379/392.01
2003/0235379 A1* 12/2003 Lin ............................ 385/101

FOREIGN PATENT DOCUMENTS

| CH | 679 193 | 12/1991 |
| EP | 0 753 906 A2 | 1/1997 |
| WO | WO 00/37978 | 6/2000 |
| WO | WO 00/71837 A1 | 11/2000 |

OTHER PUBLICATIONS

JP Patent No. 10070815, published Mar. 10, 1998, abstract attached.

* cited by examiner

*Primary Examiner*—Michelle Connelly-Cushwa
*Assistant Examiner*—Chris Chu
(74) *Attorney, Agent, or Firm*—Bachman & LaPointe, P.C.

(57) ABSTRACT

A home and building information system comprises at least one electrical mains supply, which is connected to an electrical power lead, and comprises a local optical information network for exchanging information and for supplying, controlling and monitoring peripheral devices and terminals. The electrical conductor of the mains supply and at least one optical fiber of an optical passive information network are integrated in all components while running parallel to one another. These components comprise, on one side, permanently installed installation lines with plug sockets and variable installations with flexible network cables and plugs on the other.

11 Claims, 3 Drawing Sheets

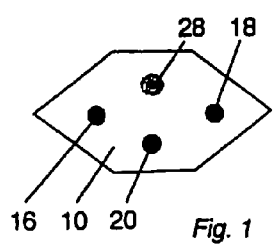
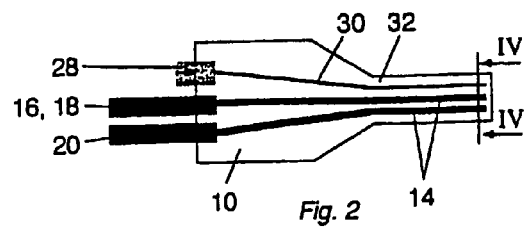
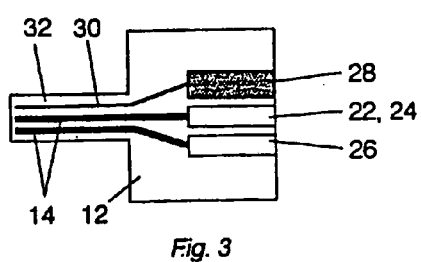
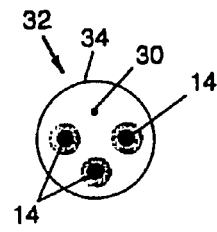
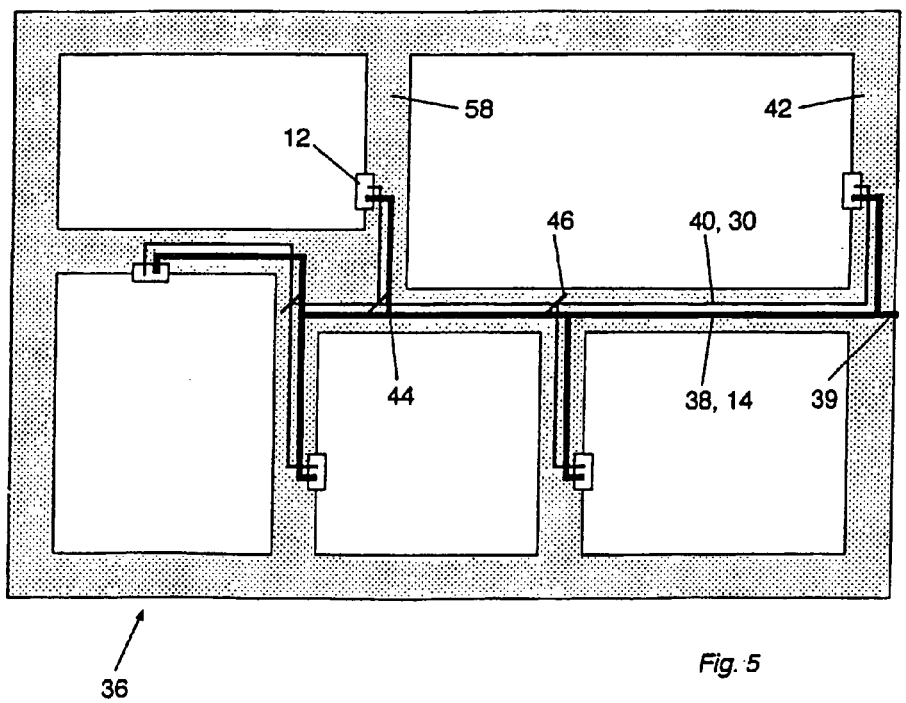
Fig. 1
Fig. 2
Fig. 3
Fig. 4
Fig. 5

HOME AND BUILDING INFORMATION SYSTEM

BACKGROUND OF THE INVENTION (1) Field of the Invention

The invention relates to a home and building information system with at least one electrical power network connected to an electrical power supply line, and at least one local optical data network for information exchange and the supply, control and monitoring of peripherals and terminals. The invention also concerns a process for the use of such an information system.

(2) Prior Art

The constantly increasing growth in data quantities and their high speed transmission impose high requirements on the infrastructure of networks and necessitate future-oriented networking concepts. Optical fibres have proved the only future-secure transmission medium with sufficiently high performance reserves. Already, transmission rates of over 10 Gbit/sec are achieved with optical fibres. The use of processes such as the wave multiplex system enables these transmission rates to be multiplied further. The term "optical fibre" here and in the text below also includes plastic light waveguides and hybrid optical conductors which are also optical transmission media.

In conventional home and building information systems, various separate networks are in operation, for example for the domestic power supply, computer, telephone and television. This not only entails disproportionately high installation costs but the resulting cable tangles cause problems for the user and make the systems unattractive. Attempts have been made to solve these problems with wireless networks, which in principle is sound but only allows limited transmission rates.

The present discussion on future-oriented network concepts above all concerns the sectors of households, businesses and administrations (last mile). The connection from workplace to workplace is also usually too complex and costly.

SUMMARY OF THE INVENTION

The inventor has faced the task of creating a home and building information system of the type cited initially in which a uniform data network based on optical fibres can be made as easy to use as an electrical power network. A single installation of the data network is easy to integrate. The data network can also be used in many ways even in the area of very high data quantities.

With regard to the home and building information system, the object is achieved by the invention in that the electrical conductors of the power network and at least one optical fibre of an optical passive data network are arranged running parallel and integrated in all components, where these components comprise firstly fixed-wired installation lines with sockets and secondly variable installations with flexible network cables and plugs. Special and refined embodiments of the invention are the subject of dependent claims.

The common components of the electrical power and data network with integral optical fibres are for example fixed-wired installation lines with sockets and variable installations such as flexible network cables, single plugs, multiple plugs and connector strips. A substantial advantage of the optical data network according to the invention is that it comprises exclusively passive components which by nature are not as dependent on technical progress as active components. Examples of passive components are optical fibres and electrical contacts.

In practice the plug connections are standard components of the electrical power network, in particular standard plugs/sockets in which in addition to the electrical conductors Live, Neutral and Earth, at least one optical fibre with corresponding contacts is integrated. In the case of multiple connections, the optical fibre has a beam splitter of conventional type.

The optical fibres of the optical data network can be connected by way of secure, disconnectable devices with an electrical power pack and optical interface, to at least one external information supply line, in particular by way of at least one transceiver (transmitter-receiver) connected to a socket or at least one modem. A transceiver connected to a socket can supply several local data networks. Practical examples of external information supply lines are telephone, television and internet lines which are preferably also optical fibres.

A fixed installed electrical power conductor can also be used as an external information supply line, where the electrical signals must be converted by way of an electro-optical coupling into optical signals. This variant is usually suitable only for relatively low transmission rates.

Commercial optical fibres allow communication at ever increasing transmission bandwidths. The usual capacity per optical fibre is around 1 Gbit/sec and doubles every year. High-channel wave multiplex systems can be achieved in particular with NZDS fibres (non-zero-dispersion-shifted fibres).

The broader the band of the optical-fibre-based data networks, the more appropriate the use of optical amplifiers. Most data networks, in particular for households, do not however require amplifiers.

In one variant, an optical fibre without electrical plug components can be taken from a network cable and externally connected by way of an optocoupling to an interface of a device if this is not connected to the electrical power network. Furthermore, an optical fibre can be taken from a network cable and connected externally to an optical interface of a device without corresponding equipment.

With reference to the process for use of an information system, the object is achieved by the invention in that it is used with different standards simultaneously. Special and refined embodiments of the process are the subject of dependent claims.

Simultaneous use can be achieved, in particular with different wavelengths and/or different transmission rates. Costly high speed transmission is suitable in particular for computers, multimedia and communication, while the cheaper lower transmission rates are appropriate for a domestic network to control and monitor domestic appliances and/or for object protection. The corresponding construction of an infrastructure with optical monomode glass fibres and the use of two separate wavelengths for transmitting and receiving, guarantee optimum operation according to current knowledge.

The standards and protocols of information transmission are preferably determined by the devices connected to the sockets. Thus, these standards can be adapted to technical developments without changing the fixed installations. Even today transmission rates of up to 10 Gbit/sec are possible. The need for local information transmission can also thus be guaranteed for a longer time horizon and the investment utilised for decades to come.

A home and building information system according to the invention can also meet all present and future technical and economic requirements. For example it comprises:
- the control of lighting, heating, shade, doors, windows, thermostats, manometers, hazardous substance indicators, cameras, access control and supervision in buildings,
- networking of PCs, printers, scanners, modems etc.
- the transmission of sound, images and data by way of multimedia, television, radio and internet.

The specific advantages of the present invention can be summarised briefly as follows:

The power supply and information can be taken from the same socket by way of the same network cable and the information supplied to the same socket.

Almost all peripherals and terminals have a flexible network cable which is also used for data transmission; no further cables are required.

A locally limited optical data network with controlled access is terminated externally by way of devices and/or dedicated lines. The information system is an investment in the future, can be installed everywhere on rewiring but also subsequently installed, is compatible with all existing technologies and open to future developments.

The optical data network is a permanent, economic installation constructed from simple passive modules, which is as easy to use as the electrical power network and has a very long life.

The local optical fibre data network is easy to scale, modular and flexible in use. Even a simple multiple socket with integral data optical fibre network forms a small network which can be used from all connected peripherals and terminals.

Mixed networks are possible, all standard components of the electrical power network without optical fibres can be integrated.

At any socket, a WLAN base station (wire local area network) can be connected and hence mobile devices integrated into the data network by way of wireless connection.

BRIEF DESCRIPTION OF THE DRAWINGS

The invention will now be described in more detail with reference to embodiment examples shown in the drawing and which also form the subject of dependent claims. The drawings show:

FIG. 1 a front view of a standard electrical plug with integral optical fibre,

FIG. 2 a side view of an open plug according to FIG. 1,

FIG. 3 a side view of an open socket for a plug according to FIGS. 1 and 2,

FIG. 4 a cross-section through a flexible network cable with integral optical fibre, FIG. 5 the fixed-wired installation lines of an electrical power and local data network, FIG. 6 a variable installation for connection to the installation lines in FIG. 5, FIG. 7 the connection of several power and data networks, and FIG. 8 a variant of FIG. 7 with a central system.

DETAILED DESCRIPTION OF THE PREFERRED EMBODIMENT(S)

Figure 6:
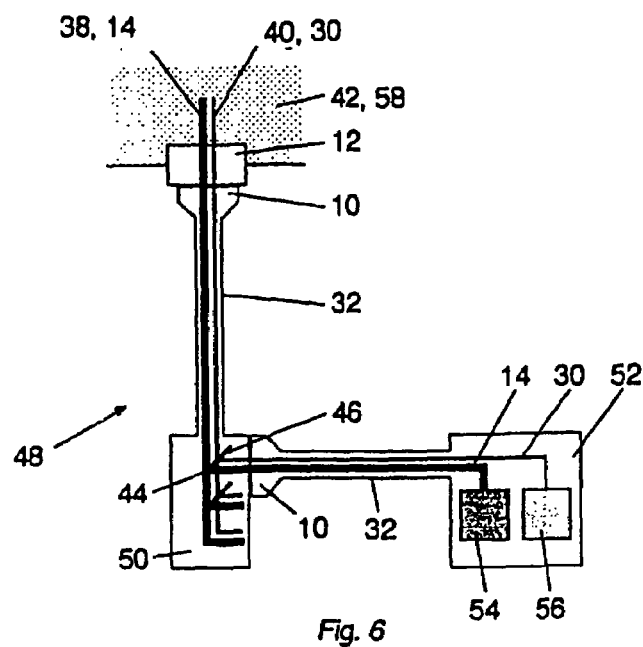

FIGS. 1 and 2 show an electrical plug 10, FIG. 3 a socket 12, both formed as standard components to Swiss standards. Insulated electrical lines 14 formed as copper wires or braids lead to the contact pins Live 16, Neutral 18 and Earth 20 or their corresponding sockets Live 22, Neutral 24 and Earth 26.

These conventionally constructed plug components 10, 12 according to the invention also contain an optical fibre 30 leading to an optocoupling 28. On the plug 10 inserted in the socket 12, not only the three electrical conductors 14 but also the optical fibres 30 are connected together. The electrical supply and data connection are created simultaneously.

Clearly a normal standard plug 10 without optical fibre 30 or optocoupling 28 can also be connected, where only the electrical supply is established but not the information flow by way of the optical fibre. Accordingly, a plug 10 with optical fibre 30 and optocoupling 28 can be placed in a normal standard socket 12 without optical fibre, where the optocoupling 28 is recessed flush. Both cases are described as mixed systems.

Evidently, the standard design depicted can easily be replaced by any standard design which is conventional in other countries.

FIG. 4 shows a cross-section IV/IV through a flexible network cable 32 according to FIG. 2. As well as the three electrical conductors 14, an optical fibre 30 is integrated into the network cable 32 and all conductors are sheathed by a protective casing 34.

An outline indicated in FIG. 5 of a building floor 36 shown at least partly has several rooms which are equipped with an electrical power network 38 and a data network 40.

The electrical power network 38, which is supplied by way of a power supply line 39 through a building external wall 42, comprises normal electrical conductors 14 of copper wires for a house installation, but can however be formed as a local bus network in the usual manner. The electrical conductors 14 lead to combined sockets 12 according to FIG. 3 which are mounted on external walls 42 and/or internal walls 58. The branches 44 of the electrical conductors 14 are formed in the usual manner as terminal connections in an installation socket.

A local data network 40 with at least one fixed installed optical fibre 30 is laid parallel to the electrical power network 38 and runs to the sockets 12. Branches in the data network are made by beam splitters 46. In a variant which is not shown, fixed installed sockets 12 can be guided individually by way of their own optical fibres 30 to a central system, e.g. a distribution box, to minimise or prevent losses in beam splitters 46. The information can be taken or supplied to all sockets 12 together with the electrical current.

The fixed insulated part of the electrical power network 38 and data network 40 shown in FIG. 5 is laid below the plaster surface, but in particular for subsequent installations can be surface-mounted in installation tubes.

In addition to the fixed laid installation lines 38, 40 according to FIG. 5, FIG. 6 shows a variable installation 48 which is connected to a socket 12 by way of a plug 10 and a flexible network cable 32. The other end of the network cable 32 is connected to a multiple plug 50 which can also be formed as a connector strip. The branches 44 of the electrical conductors 14 and the beam splitters 46 of the optical fibre(s) 30 are formed according to FIG. 5 with fixed laid installation lines.

Connected to the three-way branched connector strip 50 in FIG. 6 is a further plug 10 with a flexible network cable 32. This network cable 32 leads to a peripheral or terminal 52 which comprises a power pack 54 supplied by way of three electrical conductors 14 and an optical interface 56 supplied by way of the optical fibres 30 of the data network.

Optionally, terminals 52 without integrated optical fibres 30 can be connected to the multiple plug 50.

The variable installation 48 can be connected to any arbitrary socket 12 of an external wall 42 or internal wall 58 of a building (FIG. 5).

Figure 7:
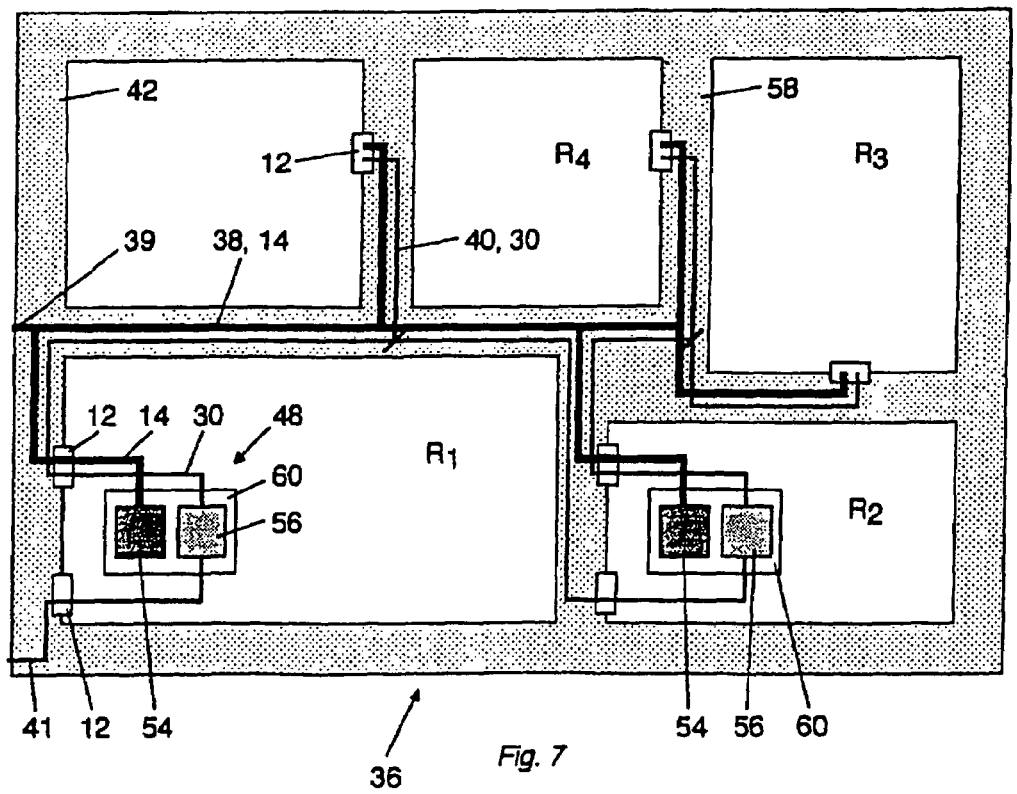

The building floor 36 according to FIG. 7 comprises, as in FIG. 5, fixed laid installation lines 14, 30 for the electrical power network 38 with a power supply line 39 and for the data network 40 with an information supply line 41. The information supply line 41 is here a telephone and cable television line.

In room R1, a variable installation in the form of a transceiver 60 is connected to a socket 12. The transceiver 60 corresponding to a peripheral or terminal 52 (FIG. 6) is connected to a socket 12 and by way of this socket 12 supplies a power pack 54 with electrical power and connects the data supply line 41 by way of attached electronics and an optical interface 56 with the local data network 40 of optical fibres 30.

Correspondingly, in room R2 is arranged disconnectably a further local data network 40 for rooms R3 and R4.

The local optical fibre data network 40 is thus a secure and encapsulated local network which can only be connected to the outside world by way of a controlled access, the transceiver 60, and which can be separated from there at any time.

Figure 8:
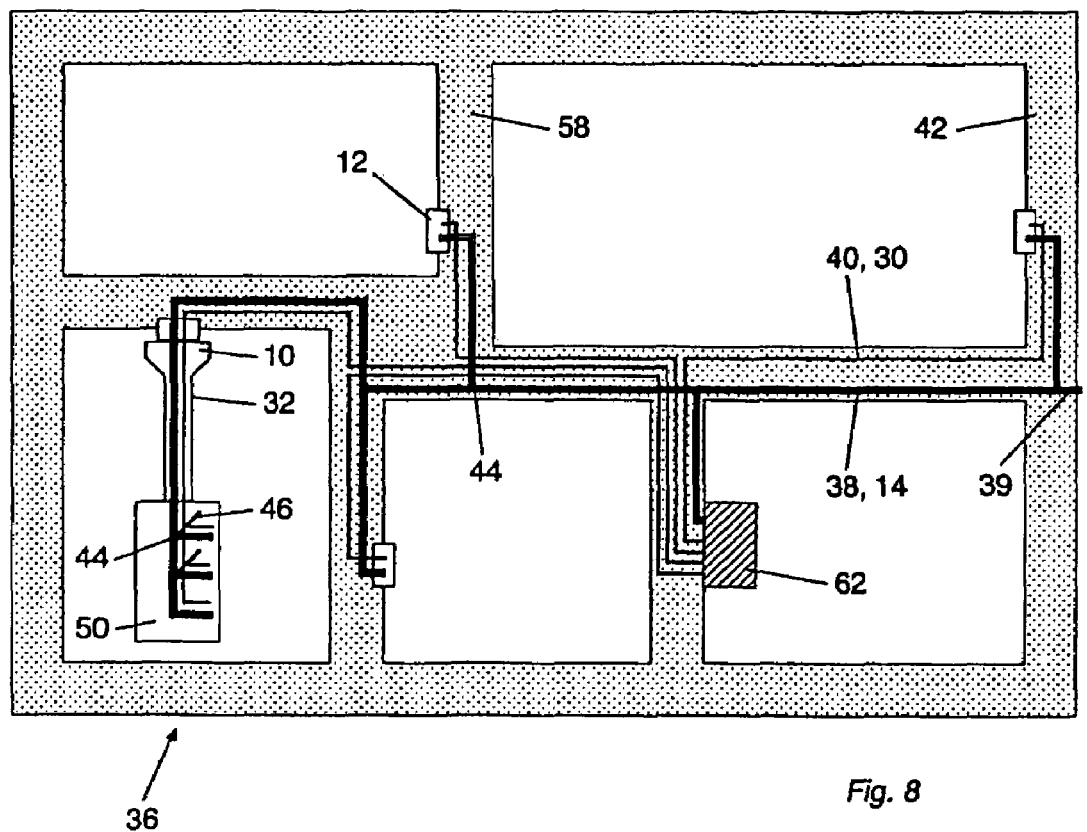

According to FIG. 8, all sockets 12 of the fixed laid installation 38 are connected by way of their own optical line 30 to a central system 62, e.g. an optical switch. To minimise losses in the fixed installed passive optical data network 40, the sockets 12 are individually led to the central system 62 each by way of an optical line 30. Thus, there is no need to use beam splitters 46.

The invention claimed is:

1. A home and building information system comprising at least one electrical power network connected to an electrical power supply line and at least one local optical data network for information exchange and the supply, control and monitoring of peripherals and terminals, and further comprising electrical conductors of the at least one electrical power network and at least one optical fiber of an optical passive data network being arranged running parallel and integrated in all of a plurality of components, and said components comprising firstly fixed-wired installation lines with sockets and secondly variable installations with flexible network cables and plugs, all sockets of the fixed-wired installation lines being connected by way of their own optical line to a central system which allows elimination or a restricted number of beam splitters in fixed laid installations and of multiple plugs in variable installations.

2. Home and Building information system according to claim 1, wherein the at least one optical fiber of the optical data network is connected to at least one data supply line by way of secured, disconnectable devices with electrical power pack and optical interface.

3. Home and building information system according to claim 1, wherein integrated in standard sockets, plugs, multiple plugs and connector strips, in addition to the Live, Neutral and Earth, is said at least one optical fiber with corresponding optocouplings, and the at least one optical fiber has a beam splitter at each branch of the electrical conductors, in each multiple plug and in each connector strip.

4. Home and building information system according to claim 1, wherein the optical data network is connected to at least one external information supply line by way of an optical interface connected to a socket, and at least one transceiver with power pack and optical interface or at least one modem.

5. Home and building information system according to claim 1, wherein a transceiver connected to a socket supplies several local data networks.

6. Home and building information system according to claim 1, further comprising at least one data supply line comprising at least one of a telephone, television and internet line.

7. Home and building information system according to claim 1, wherein the at least one optical fiber is taken from a flexible network cable and connected externally to an optical interface of a peripheral or terminal not supplied by the at least one electrical power network.

8. Home and building information system according to claim 1, wherein the at least one optical fiber is taken from a flexible network cable and connected externally to an optical interface of a peripheral or terminal without corresponding equipment.

9. Process for use of an information system according to claim 1, wherein it is used with different standards simultaneously.

10. Process according to claim 9, wherein the standards and protocols of information transmission are determined by devices connected to the sockets.

11. Process according to claim 9, wherein computer networks, multimedia and communication devices with high speed transmission up to around 10 Gbit/sec, domestic appliances, office and workshop machines with lower transmission rates are operated with separate wavelengths for transmission and reception.

* * * * *